United States Patent [19]

Maurer

[11] 3,934,846
[45] Jan. 27, 1976

[54] DEVICE TO REDUCE FLOW INDUCED PRESSURE OSCILLATIONS IN OPEN CAVITIES

[75] Inventor: Otto F. Maurer, Dayton, Ohio

[73] Assignee: The United States of America as represented by the Secretary of the Air Force, Washington, D.C.

[22] Filed: Oct. 8, 1974

[21] Appl. No.: 513,025

[52] U.S. Cl. .............................................. 244/130
[51] Int. Cl.² .......................................... B64C 7/00
[58] Field of Search ................ 244/130, 137 R, 113

[56] References Cited
UNITED STATES PATENTS
2,791,387   5/1957   Weinberg ....................... 244/137 R Primary Examiner—Trygve M. Blix
Assistant Examiner—Paul E. Sauberer
Attorney, Agent, or Firm—Joseph E. Rusz; Arthur R. Parker

[57] ABSTRACT

A combined air flow deflector and diffuser assembly including a main flow deflector vane, a deflector base plate mountable adjacent the trailing edge of an open bomb bay or other cavity of a bomber aircraft, aerospace or other vehicle, and a plurality of support pylons interconnected between and supporting the deflector vane in space relation to the base plate immediately behind the bomb bay or other cavity-trailing edge in the path of, and diverting the airstream away from the vehicle body to thereby partially stabilize the turbulent flow at the shield area or airstream flow adjacent the cavity entrance and, simultaneously therewith, induce a substantial decrease of the excessive pressure oscillations that would otherwise occur within the cavity from the air stream flow passing the open cavity. Additional significant reduction primarily in the cavity pressure oscillations results from the formation of a series of divergent, air flow diffusing slots respectively between the base plate and flow deflector vane, and the support pylons and through which a portion of the air stream flows.

13 Claims, 14 Drawing Figures

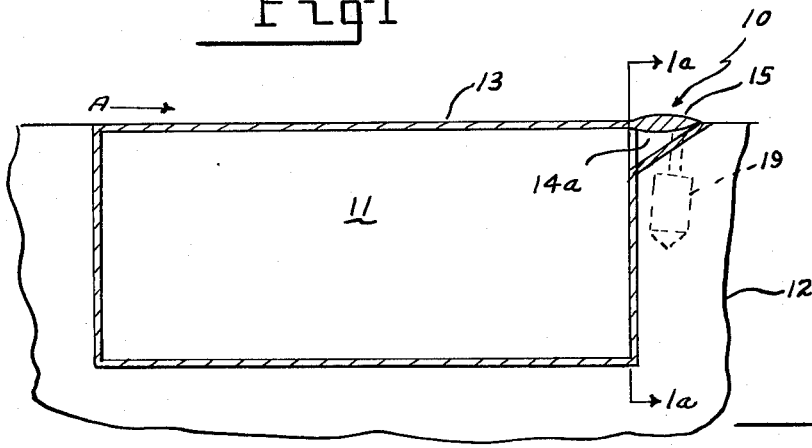
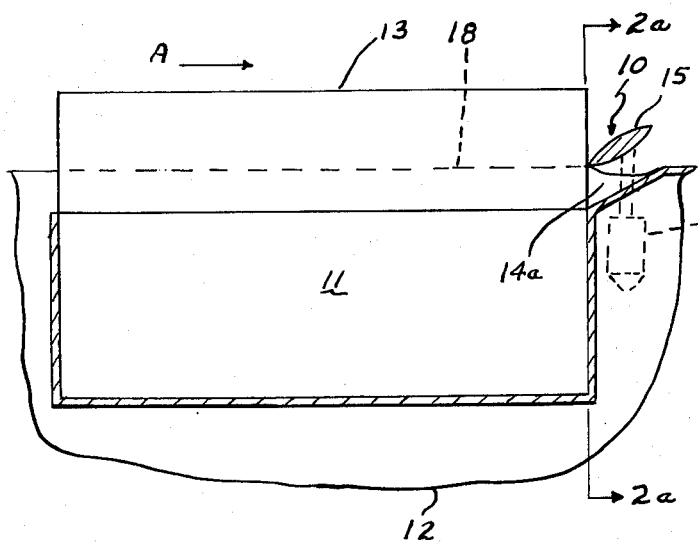
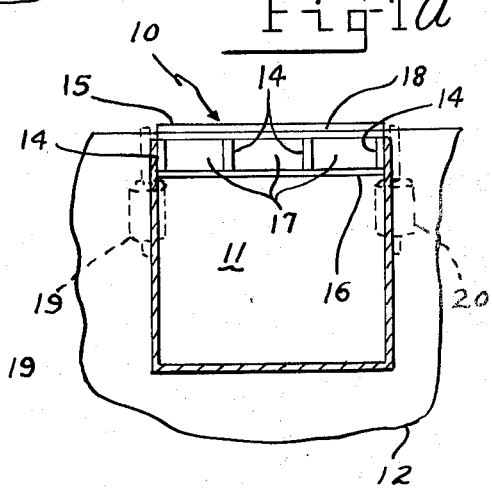
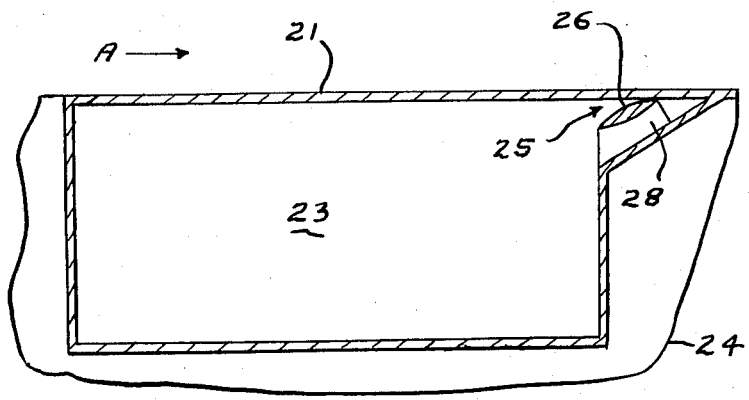
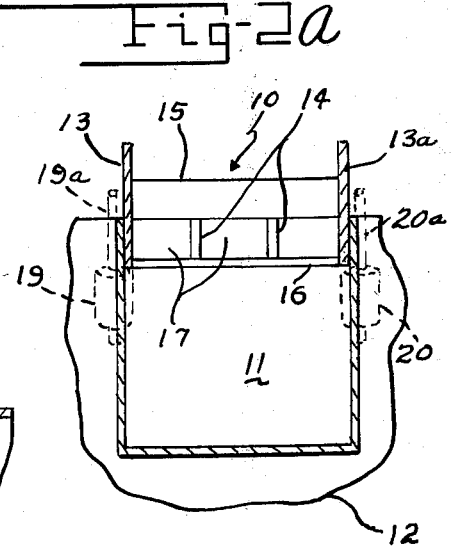

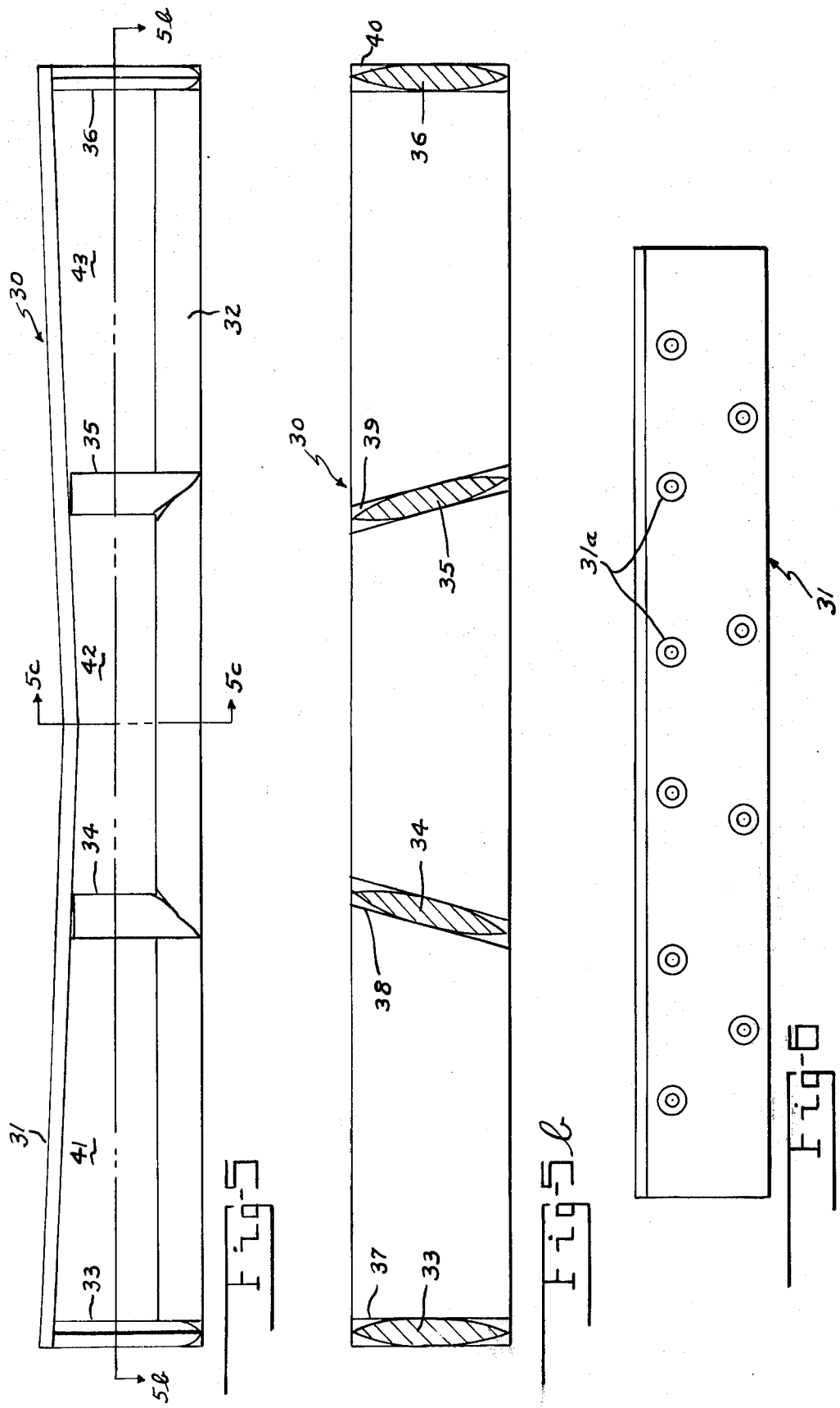

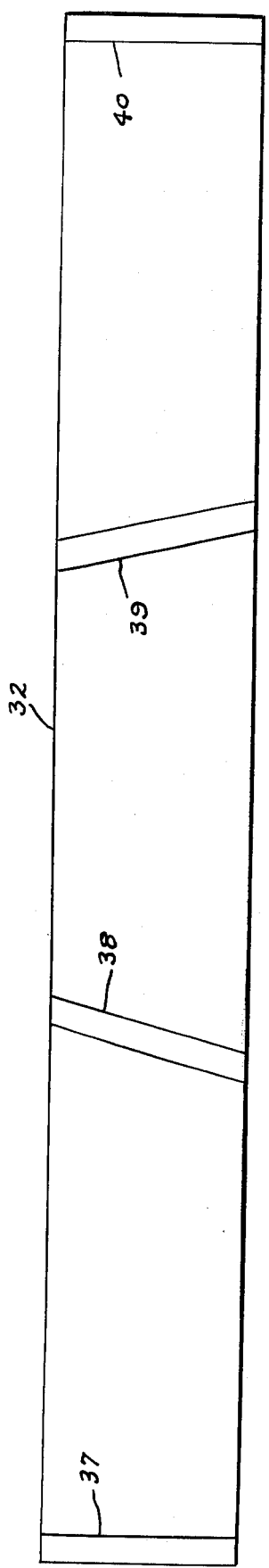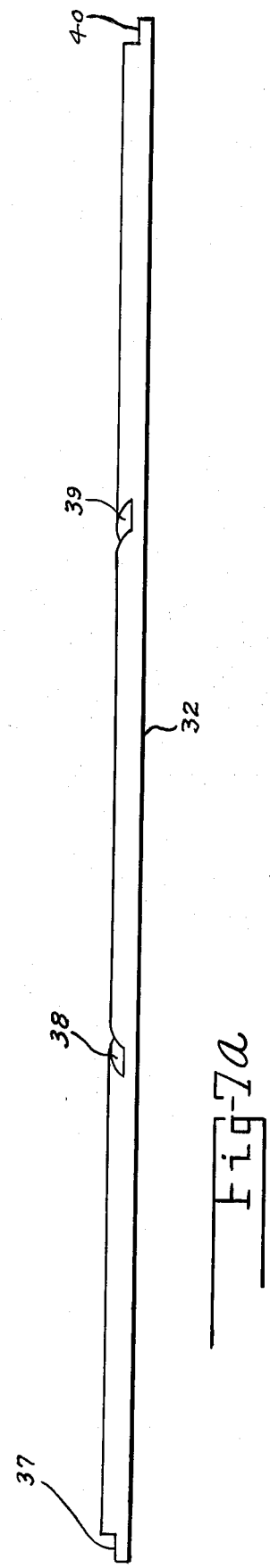

DEVICE TO REDUCE FLOW INDUCED PRESSURE OSCILLATIONS IN OPEN CAVITIES

RIGHTS OF THE GOVERNMENT

The invention described herein may be manufactured and used by or for the Government of the United States for all governmental purposes without the payment of any royalty.

BACKGROUND OF THE INVENTION

This invention relates generally to an air flow deflector device that is principally operative to reduce air stream flowinduced excessive pressure oscillations occurring in the open cavities of aircraft, aerospace and other vehicles operating particularly at relatively high speeds.

An important problem involved in the accurate aerial delivery of weapons and other stores on selected targets concerns the excessive pressure oscillations caused or induced by the flow of the air stream past the cavity or cavities containing such weapons or other stores. When these cavities have been opened in preparation for the release of such stores, the relatively high speed air stream flow past the so-called "shield" area, which is the area of flow immediately over or under the opened cavity, will cause relatively large pressure oscillations at the said shield area and thus within the cavity itself. This phenomenon, which is also known as cavity resonance, can and has caused damage or even destruction of the vehicle structure or stores contained in the open cavity, and, moreover, may also result in damage to or malfunction of equipment and even adversely affect the operation of the vehicle itself. The obvious disadvantage of the latter, for example, to a bomber aircraft on a bombing run is self-evident. Finally, such excessive pressure oscillations, particularly when coupled with turbulent flow immediately outside of the cavity, can easily cause the released bombs or other stores to tumble further affecting their accurate release on target.

Previous efforts have been made for many years to solve, or, at least, to reduce the aforementioned instability effects of the excessive pressure oscillations and/or turbulence resulting from the air flow past the open cavity and even the entry thereof into the cavities itself. In one example, taught in U.S. Pat. No. 2,451,479, issued to W. S. Diehl on Oct. 19, 1948, there is illustrated a flow controlling screen that is disposed in the path of the free stream flow past an open bomb bay at the leading edge thereof. Naturally, with the use of such a screen, the turbulence of the free stream flow obviously tends to be reduced. However, although this arrangement appeared to offer some advantage in reducing the overall circulation of the free stream air in the open bomb bay compartment due to the diffusion effect on the air stream, its use in reducing buffeting therein appears to be minimal. More importantly, the use of such a screen suffers from the significant disadvantage of offering, in addition, very high aerodynamic resistance, particularly when considered in the light of the much faster cruising speeds of today's bomber and other aircraft and aerospace vehicles. Finally, its effect on reducing cavity resonance appears minimal.

A second principal solution offered to alleviate the foregoing problem of the excessive turbulence produced in the open cavities of aerospace and other vehicles due to the free stream flow thereinto and also, perhaps, reduce the aforementioned cavity resonance involves the use of some kind of a flap or vane deflector. In this regard, in another U.S. Pat. No. 2,243,906, issued to A. Huet on June 3, 1941, it was proposed to use one or more flaps disposed in front of the forward vehicle, representing for example, the lead car or two or more interconnected cars naturally constituting a train. The aforementioned flaps or vanes are installed forwardly of the forward car, for example, of the train, as noted hereinbefore, for the purpose of creating a so-called "stream-lined" air flow around the car, without the body of the car itself being required to be stream-lined. Thus, the inherent resistance to the air, or, in other words, the drag of the car is reduced in this way in accordance with the teachings of the aforementioned U.S. Pat. No. 2,243,906 system. A further reduction in the resistance offered by the surrounding air is also taught by the latter patent by adding other flap deflectors at the gaps between the interconnected cars for eliminating eddy currents normally formed thereat.

In still another patent; namely, U.S. Pat. No. 2,749,064, issued to W. H. Kuhlman on June 5, 1956, a flap element is pivoted to the fuselage of a bomber aircraft just ahead of the bomb bay thereof. It is stated in this patent that plain flaps mounted forwardly of the bomb bay for directing the air stream over the open bomb bay are already known. However, such plain flaps, though certainly offering some improvement in generally reducing air turbulence and thus a decreased air flow into the bomb bay to thereby reduce the buffeting effect thereof, they have practically no effect on the pitching moment being imparted to the bomb or other store after its release from the bomb bay. As a further improvement, the aforementioned Kuhlman patent provides a flap or deflector surface that is combined with a grid. The flap is pivoted to the aircraft fuselage just forwardly of the bomb bay for a selective adjustment between a flush relation and an extended relation in the air stream to a positive angle of attack. This flap is improved over the so-called "plain" flap of previous proposals by being so pivoted that, when it is in its extended position, the leading edge thereof is made specifically spaced from the bottom of the fuselage of the aircraft to provide what is, in effect, a slot or narrow passage between the flap and fuselage. In this manner, a portion of the air stream flows through the said passage and is diffused thereby and its velocity thus diminished to reduce the air turbulence that would, but for the spaced flow diverter flap, be otherwise created thereby. This turbulence is further reduced, as is disclosed in the aforementioned Kuhlman patent, by the combination of a grid member with the above-noted spaced flap, which grid extends from adjacent the trailing edge of the flap into the path of the air flow from and rearwardly of the slot or passage between the flap and aircraft to thereby provide for the further control and reduction of air turbulence. On the other hand, the unique flow deflector device and diffuser assembly of the present invention, to be set forth hereinafter in the following summary and detailed description, is considered to constitute a still further improvement in that it places a novel deflector flap device at the trailing edge of the cavity and, as such, is designed principally to reduce the previously-referred to phenomenon of cavity resonance, whereas the aforementioned previously-noted proposals, using flaps at the forward edge of the cavity, as in the Kuhlman patent, are directed primarily to the reduction in the turbulence of the air flow.

SUMMARY OF THE INVENTION

The present invention consists in a new and improved combined and self-contained air flow deflector and diffuser assembly that may include, in one form thereof, a deflector base plate fixedly mountable to the fuselage of a bomber aircraft, for example, at the trailing edge of its bomb bay, a main air flow deflector plate positionable in the path of, and automatically diverting a significant portion of the air stream away from and as it passes the open bomb bay, and a series of pylons interconnected in rigid relation to, and providing a plurality of novel, built-in air diffusion slots or passages between said main deflector plate and deflector base plate, which diffusion slots or passages are disposed in transverse relation to the incoming air flow when the present device is placed in its operative position.

In accordance with the unique teachings of the present invention, a single device comprising the inventive air flow deflector and diffuser assembly may be either installed at the trailing edge of the bomb bay or, if desired and for additional benefit, a second such device may also be installed at the leading edge thereof, either as a fixed part of the aircraft structure or they may be made retractable during closed bomb bay operation by any of a number of well-known means. In this connection, it is to be emphasized that the present flow deflector and diffuser assembly is generally applicable to reduce flow induced pressure oscillations in any open cavity of aircraft, aerospace or other vehicles, particularly when operating at high speeds.

Other objects and advantages of the invention will readily appear hereinafter in specific connection with the following disclosure taken with the accompanying drawings, in which:

BRIEF DESCRIPTION OF THE DRAWINGS

FIGS. 1 and 2 are schematic side elevational views, partly broken-away and sectioned, illustrating the broad application of a retractable form of the new and improved combined air flow deflector and diffuser assembly of the present invention to the upward-facing cavity of an appropriate vehicle with the cavity doors thereof being respectively depicted in their closed and open positions;

FIGS. 1a and 2a respectively show cross-sectional views, partly schematic, sectioned and broken-away, and taken about on line 1a—1a and line 2a—2a of FIGS. 1 and 2 to show other details of the invention;

FIGS. 3 and 4 represent additional schematic side elevational views, partly broken-away and sectioned, of a more basic, fixed, non-retractable modification of the instant invention, as applied to a suitable vehicle and with the cavity doors thereof being respectively denoted in their closed and open positions;

FIG. 5 is a rear view, illustrating the principal components of the overall assembly of one type of the basic, fixed non-retractable form of the invention;

FIG. 5b is a longitudinal sectional view, taken on line 5b—5b of FIG. 5 and more clearly depicting additional details of the support pylons used to interconnect the main flow deflector vane and deflector base plate of the instant invention;

FIG. 6 is a plan view of the deflector base or mounting plate used particularly with and as an integral part of the invention; and FIGS. 7 and 7a are respectively plan and front views, showing certain details of the main flow deflector plate or vane of the present invention.

DESCRIPTION OF THE PREFERRED EMBODIMENT

Figure 4:
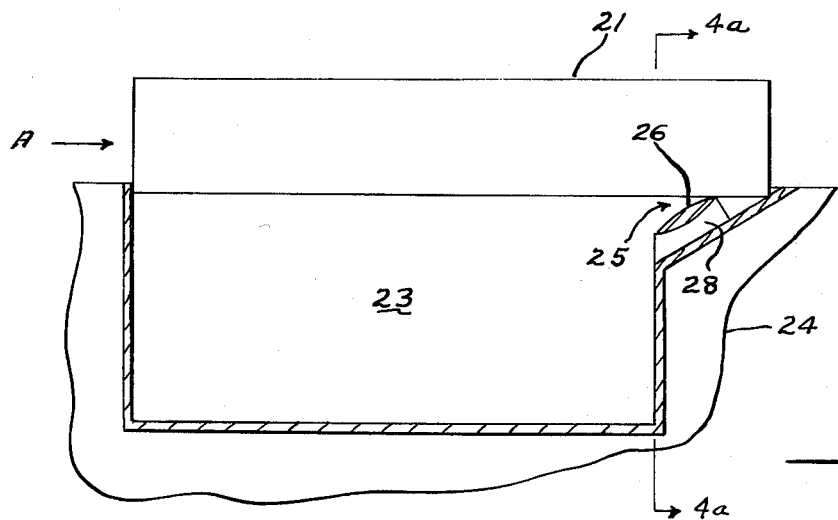

Referring generally to the drawings and, in particular, to FIGS. 1 and 1a of the drawings, a retractable application of the new and improved combined air flow deflector and diffuser assembly of the present invention is indicated generally and in schematic form at the reference numeral 10 as being applied to the trailing edge of the weapons or other stores cavity or bay 11 of an aircraft or aerospace or other vehicle, the fuselage or body of which being indicated in broken-away form at the reference numeral 12. The cavity or bay 11 may also specifically represent the bomb bay of a bomber aircraft with, of course, its orientation thereof being reversed to a downward-facing direction. The cavity or bay 11 is closed by a pair of doors, shown in section and schematically at 13 and 13a (FIG. 2a), which doors have not been shown in FIG. 1a for the sake of clarity and in particular to enable a clearer view of the complete set or series of four support pylons, seen at 14 in the said FIG. 1a, that are used to support and interconnect a main air flow deflector plate or vane or flap 15, in this instance, above and separated from a deflector base or mounting plate 16 to form a unique set or series of air stream flow-communicating and diffuser passages or slots, indicated at 17 as being principally located between the said plates 15 and 16 and further alternately disposed between the support pylons 14. Both the main air flow deflector and base or mounting plates 15, 16, as well as the diffuser passages or slots 17 and support pylons 14 will be hereinafter more clearly disclosed and described in specific connection with FIGS. 5–7, inclusive.

It is noted that, if desired, the aforementioned combined air flow deflector and diffuser assembly 10 could be rigidly affixed in position in transverse relation across and/or nearly adjacent the trailing edge of the cavity or bay 11 (FIG. 1) to the outside surface of the fuselage or body 12 and thus always remain in an exposed position. Also, there could be a similar device installed at the forward edge of the cavity or bay 11. However, it is considered preferable and obviously more advantageous, for example, from the standpoint of reduced aerodynamic drag to have the inventive flow deflector and diffuser assembly 10 made into the retractable configuration of the aforementioned FIGS. 1 and 2. In the latter FIGS. 1 and 2, as well as their supporting FIGS. 1a and 2a, it is clearly seen that the combined air flow deflector and diffuser assembly 10 and, in particular, the deflector base or mounting plate 16 and support pylons 14 are rigidly supported to, and located within or, in other words, below the outer surface of the fuselage or body 12 to a sufficient depth (Note and pylon 14a) to enable and ensure that the main air flow deflector plate, vane or flap 15, when at rest in its inactive and non-extended position of FIG. 1, is in a practically flush relation relative to the outer surface of the said fuselage or body 12. When in the said inactive, non-extended position, the said deflector plate, vane or flap 15 would be arrested on the support pylons, as is indicated in the view of FIGS. 1 and 1a. To this end, the pylons 14 could each incorporate an arcuate-shaped upper surface with which a similarly shaped surface configuration of the main deflector plate 15 would precisely engage in supporting relation with the arcuate-shaped surface of the said pylons, as is seen, for example, in both FIGS. 1 and 2 for the left-hand pylon 14a.

For the retractable and extendable form of the inventive air flow deflector and diffuser assembly 10 of FIGS. 1 and 2, the main air flow deflector plate, vane or flap 15 could be easily hinged or otherwise pivoted by any suitable and well-known means (not shown) along the hinge or pivot axis, indicated generally at the reference numeral 18, for instance, in FIGS. 1a and 2, which hinge or pivot axis 18 would be also aligned or substantially aligned, for example, with the trailing edge of the cavity or bay 11 and would, furthermore, be located at the appropriate ends of the support pylons 14. Moreover, the main deflector plate, vane or flap 15 would be hinged or pivoted at or near its leading edge. Note that the direction of the air stream flow is indicated by the arrow at A. Thus, with this unique arrangement and with the cavity or bay doors, 13, 13a being opened preparatory to the release of the stores in the cavity 11, a pair of oppositely-disposed actuators, depicted in schematic form only at 19 and 20, since the specific details thereof are not important to the present invention, may be actuated to rotate the main flow deflector plate, vane or flap 15, through the connecting operating arms 19a and 20a, to its active or extended and air flow deflecting or diverting and diffusing position of FIGS. 2 and 2a.

As an alternative arrangement, seen in FIG. 3, for example, the combined air flow deflector and diffuser assembly of the invention, which is indicated generally at 25, may be mounted, where the particular design of the cavity doors, as at 21 and 22 (FIG. 4a) would permit it, and stored completely inside the vehicle structure 24 in supporting relation transversely across the width of the cavity or bay 23, at or immediately below the trailing edge thereof, so that when the said doors 21, 22, when in their closed position of FIG. 3, would completely enclose the inventive air flow deflector and diffuser assembly 25, as is clearly illustrated. Of course, the inventive device 25, which would be of the fixed flow deflector form, would be automatically active, after opening of the doors, as at 21 and 22 in FIGS. 4 and 4a, without any additional movement being required thereof. Again, as in the inventive form of FIGS. 1 and 2, the combined air flow deflector and diffuser assembly 25 would consist of a main air flow deflector plate, vane or flap 26, a deflector base or mounting plate 27 (FIG. 4a), and a set or series of four support pylons, indicated generally at 28, which are, again, uniquely used to separate the plates 26 and 27 from each other and thereby provide a series of air diffuser slots or passages 29 therebetween, and which slots are also alternately disposed between respective pylons 28. Of course, with this fixed arrangement of the invention, no hinge or pivot, as indicated by the axis 18 in FIG. 1a, would be used and both plates 26, 27 would be rigidly attached to opposite ends of the support pylons 28.

Figure 4A:
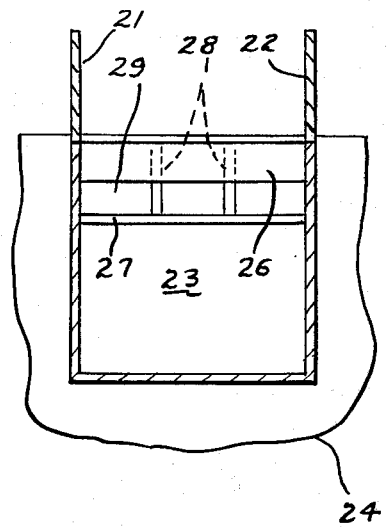
FIG. 4a is another cross-sectional view, partly broken-away, schematic and taken about on line 4a—4a of FIG. 4 to more clearly show further details of the invention as permanently affixed in position beneath, or enclosed by the cavity doors.
Figure 5A:
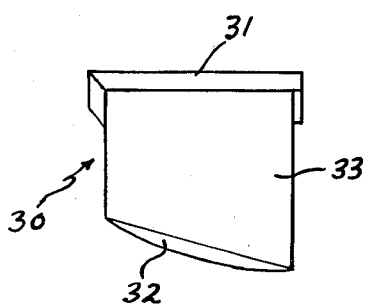
FIG. 5a is a left end view of the assembly of FIG. 5, showing the basic aerodynamic shape preferably employed for the main deflector vane of the invention.
Figure 5C:
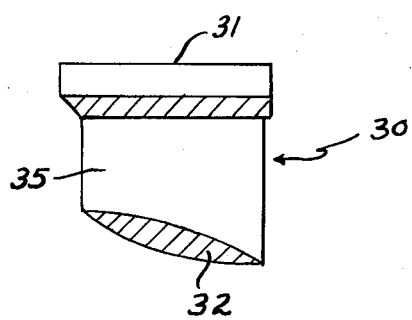
FIG. 5c is a cross-sectional view taken about on line 5c—5c of FIG. 5, illustrating the preferred aerodynamic shape of, and positive angle of attack inherently built into the main air flow deflector vane of the invention.

With particular reference to FIG. 5, a 15° weldment aircraft test model of the novel combined air flow deflector and diffuser assembly of the invention that is usable with and as the fixed version thereof previously described with specific reference to FIGS. 3, 4 and 4a is indicated generally at 30 as, again, principally comprising a deflector base or mounting plate 31, a main air flow deflector plate, vane or flap 32, and a plurality of four support pylons at 33, 34, 35 and 36. As is seen more particularly and respectively in FIGS. 5a and 5c, and FIG. 5b, both the main deflector plate, vane or flap 32 and the support pylons 33 through 36 (FIG. 5b) are aerodynamically shaped. Although the latter configuration is not absolutely essential to the principal teachings of the present invention, the aerodynamic shape is preferable since it is considered as offering at least a slight increase in the overall efficiency of the inventive flow deflector and, in addition, because of its streamlined effect, a significantly reduced amount of aerodynamic drag would be offered thereby to the flow of the air stream therethrough and therearound. Also, the positive angle of attack built into the flow deflector vane 32 is clearly depicted in both FIGS. 5a and 5c.

As depicted in the aforementioned FIGS. 5 and 5b, the two end support pylons 33 and 36 are each oriented both in a vertical direction and directly face the incoming air stream, whereas, the middle pair of support pylons 34 and 35 are oriented at a 15° angle away from and to the left (pylon 34) and right (pylon 35) of the principal direction of the incoming air stream flow, which, as viewed in FIG. 5, would be coming out of and at right angles to the plane of the paper through the several air diffuser slots or passages 41, 42 and 43. Thus, as viewed from the cockpit of an aircraft, for example, the two central pylons 34 and 35 are divergently oriented with respect to each other in the downstream direction. The support pylons 33–36 may be affixed in their appropriate positions as by silver soldering in a suitably sized slot or groove that has been initially formed or incorporated at the corresponding locations of the main flow deflector plate 32, which grooves or slots are more particularly depicted at the reference numerals 37, 38, 39 and 40 in FIGS. 7 and 7a; which grooves have been previously cut out of the surface of the deflector plate 32 prior to the respective mounting therewithin of the aerodynamically-shaped support pylons, as at 33, 34, 35 and 36 (FIGS. 5 and 5b) corresponding thereto. Thereafter, the deflector base plate 31, which may preferably be of a generally rectangular configuration, as is depicted at 31 in FIG. 6 and which may incorporate a plurality of openings or bolt holes, as at 31a for its attachment to the body or fuselage of an aircraft, for example, is attached to the opposite ends of the pylons 33–36.

Again referring to FIG. 5, the previously referred to plurality of air flow and diffuser passages or slots are indicated respectively by the reference numerals 41, 42, and 43 as alternately disposed between the successively-positioned support pylons 33, 34, 35 and 36, and also between the plates 31 and 32. It is noted that the deflector base plate, as at 31, for example, is shown bent in the middle for the express purpose of being accommodated to a particular aircraft model actually tested employing the present invention. The bending of the base plate 31 in the middle, however, serves another and far more important purpose; namely, that of specifically providing a built-in expansion to the outside in the volume encompassed in each of the spaces of the diffusion slots or passages, 41, 42 and 43, which novel technique thereby ensures the specific and controlled diffusion and expansion of the air stream as it passes through the said slots in the downstream direction. Although this diffusion feature naturally has a stabilizing effect on the turbulence of the air stream, its most significant function and one which is the principal teaching of the present invention is to provide significant assistance to the deflection action imposed on the air stream by the main flow deflector vane 32 in substantially reducing the excessive pressure oscillations that would otherwise, but for the application of the inventive apparatus, be occuring at both the shield area of, and in the open cavity itself. In this regard, the previously-described divergent configuration or orientation of the support pylons 34 and 35, likewise, provides even further for an additional expansion to and thus diffusion of that portion of the air stream passing therethrough to similarily reduce its velocity and turbulence for a more stabilized flow. In this connection, it is to be emphasized that the inventive apparatus, by being placed at the trailing edge of the open cavity, though reducing air turbulence somewhat, has, as its principal effect, the reduction of the excessive pressure oscillations at the shield area and in the cavity per se, as hereinabove noted. In fact, in actual tests of the invention, a reduction in the pressure oscillations at the said cavity shield area and within the cavity itself of approximately 93% was noted.

Although the present invention is principally concerned with the placement of an improved flow deflector flap member at the trailing edge of an open cavity, a similar flap member may be also positioned at the forward edge to then act, in concert with the trailing edge flap device, to accomplish a slight increase in the efficiency of the latter element.

With the inventive combined air flow deflector and diffuser assembly as at 10 in FIGS. 1 and 2 or as indicated at 25 in FIGS. 3 and 4 being disposed in their operative positions with their respective main flow deflector plates, vanes or flaps, as at 15 (FIG. 1) or at 26 (FIG. 3), being disposed in the path of the flow of the air stream A at the trailing edge of the corresponding open weapons cavity 11 or 13, for example, the principal portion of the aforesaid air stream flow in the immediate region of the respective cavity, will, as it passes the said open cavity and reaches the main flow deflector vane 15 or 26, be diverted away from the aircraft fuselage, as at 12 or 24. Of course, the result of this air flow deflecting action is to induce a major portion of the general flow of the air stream A, as it passes the open cavity 11 or 23 (FIG. 1 or 3), away from and therefore inhibiting its normal creation of excessive pressure oscillations at the shield area of the cavity and within the cavity. In effect, a more stream-lined flow of the air stream is induced by the combined air flow deflecting and diffusing action of the inventive apparatus, as it passes the open cavity to thus significantly counteract the normal marked tendency thereof to oscillate at the cavity entrance.

I claim:

1. In an aircraft, aerospace or other vehicle having a bomb bay or other cavity for containing weapons or other stores, and door or other enclosure means openable during vehicular operation to expose the open cavity to the relatively fast moving air stream; a combined air flow deflector and diffuser device for reducing excessive pressure oscillations being otherwise induced in and near the open cavity by the inherent unsteady nature of the relatively fast moving air stream flow past the said cavity, as is manifested by the normal considerable inward and outward movement of the said flow relative to the said open cavity when said device is not being utilized; said device comprising; a first, main flow diverter element located in a predetermined spaced relation from the body of said vehicle directly in the path of, and automatically operative to divert a substantial portion of the air stream away from its normal entry into, and thus reducing the intensity of the pressure oscillations both at the entry to, and within the open cavity; second, main flow diverter element-mounting means for attaching said first, flow diverter element in the said predetermined spaced relation from the aircraft fuselage or other vehicular body at a predetermined position in alignment with a location preferably adjacent or substantially adjacent the trailing edge of the open cavity; and third, flow diffuser means comprising divergent slotted means inherently incorporated in said combined air flow diverter and diffuser device between said first, flow diverter element and said mounting means, and further disposed in the path of, and automatically acting to reduce the velocity of the incoming air stream by the diffused flow of a significant, additional portion of the air stream flowing past the open cavity through the said divergent slotted means to thereby further somewhat reduce the inherent turbulence and circulation of air that would otherwise normally occur throughout the interior of the open cavity, and, simultaneously therewith, effecting the substantial elimination of the excessive pressure oscillations resulting at the shield area and within the said open cavity from the inherent and substantial inwardly and outwardly-oriented movements normally tending to occur within, and causing the unsteady flow of the air stream during its movement past the open cavity.

2. In a combined air flow deflector and diffuser device as in claim 1, and fourth, support means interconnected between said second, main flow diverter element-mounting means and said first, main flow diverter element.

3. In a combined air flow deflector and diffuser device as in claim 2, wherein said fourth, support means comprises a plurality of separate rigid interconnecting members oppositely attached to said main flow diverter element and said mounting means.

4. In a combined air flow deflector and diffuser device as in claim 3, wherein said first, main flow diverter element comprises a deflector flap means.

5. In a combined air flow deflector and diffuser device as in claim 4, wherein said second, main flow diverter element-mounting means comprises a deflector base member directly affixed to the aircraft fuselage or other vehicular body.

6. In a combined air flow deflector and diffuser device as in claim 3, wherein said first, main flow diverter element comprises an aerodynamically shaped deflector flap member.

7. In a combined air flow deflector and diffuser device as in claim 6, wherein said fourth, support means comprises a plurality of separate support pylons interconnected between said flow diverter flap member and said deflector base member, and defining the said divergent slotted means of said third, flow diffuser means into a series of separate flow diffuser slots or passages disposed in alternate relation relative to said separate support pylons and between said main flow diverter flap member and said deflector base member.

8. In a combined air flow deflector and diffuser device as in claim 6, wherein said fourth, support means comprises a plurality of separate and aerodynamically shaped, support pylons.

9. In a combined air flow deflector and diffuser device as in claim 8, wherein said plurality of support pylons includes a first pair of oppositely-disposed support pylons disposed in streamlined relation to the air stream and interconnected between respective opposite ends of said main flow diverter flap member and said deflector base member; and a second pair of spaced and intermediately-disposed support pylons oriented at a predetermined divergent angle relative to each other and facing in the downstream direction to thereby provide for a centrally-located slot or passage disposed directly in the path of the air stream flow and thus ensuring the automatic substantial and outward expansion both of the volume of the said centrally-located, diffusion slot or passage and the progressively increasing diffusion of the incoming air stream as the latter passes therethrough from its upstream to its downstream side.

10. In a combined air flow deflector and diffuser device as in claim 9, wherein said deflector base member comprises a mounting plate bent upwardly in the middle a predetermined degree to gradually increase the vertical width and thus the volume of the flow diffuser slots or passages outwardly to both left and right-hand sides of the said third, flow diffuser means and thereby further progressively diffuse the incoming air stream flow as it passes through said diffuser slots or passages to thus provide a somewhat added control means to the positive control technique already being inherently and effectively provided in a relatively large measure by the divergent angle setting of the said second pair of support pylons to the degree of diffusion and simultaneous reduction in the intensity of the pressure oscillations normally occurring at and in the open cavity during vehicular operation.

11. In a combined air flow deflector and diffuser device as in claim 2, wherein said second, main flow diverter element-mounting means comprises a deflector base member; said fourth, support means comprises a plurality of separate support pylons; and said first, main flow diverter element comprises a deflector flap member rigidly attached to said support pylons and continually exposed in the air stream.

12. In a combined air flow deflector and diffuser device as in claim 11, wherein said first, main flow diverter element comprises a deflector flap member pivotally or hingedly attached to one end of each of the said support pylons for selective movement between a first, flush or substantially flush relation to the surface of the aircraft fuselage or other vehicular body when in its active position and the cavity doors or other enclosure means are closed, and a second, extended and active position in the path of the air stream when the cavity doors or other enclosure means are opened.

13. In a combined air flow deflector and diffuser device as in claim 2, wherein said second, main flow diverter element-mounting means comprises a deflector base member disposed at the trailing edge of the cavity at a first, relatively great depth below the surface of the aircraft fuselage or other vehicular body; said fourth, support means comprises a plurality of support pylons rigidly affixed at the inner ends thereof to said deflector base member; and said first, main flow diverter element comprises a deflector flap member rigidly affixed to the outer ends of said support pylons and disposed at a second, relatively small depth with its leading and upper edges respectively arranged at the trailing edge of the cavity and in flush relation to a hinged axis of the said cavity doors or other enclosure means for concealment by the said doors or other enclosure means when in their closed condition, and in continuous and automatic exposure to, and action upon the air stream when the said doors or other enclosure means are in their opened condition.

* * * * *